US012552194B2

(12) United States Patent
Berthe

(10) Patent No.: US 12,552,194 B2
(45) Date of Patent: Feb. 17, 2026

(54) SECURITY DOCUMENT COMPRISING A PERFORATED OPAQUE LAYER WITH A WHITE APPEARANCE ABOVE A MATRIX OF COLOURED SUB-PIXELS

(71) Applicant: IDEMIA FRANCE, Courbevoie (FR)

(72) Inventor: Benoit Berthe, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 0 days.

(21) Appl. No.: 18/476,778

(22) Filed: Sep. 28, 2023

(65) Prior Publication Data

US 2024/0100875 A1 Mar. 28, 2024

(30) Foreign Application Priority Data

Sep. 28, 2022 (FR) ..................................... 22 09844

(51) Int. Cl.

| | |
|---|---|
| ***B42D 25/346*** | (2014.01) |
| ***B41M 5/34*** | (2006.01) |
| ***B42D 25/373*** | (2014.01) |
| ***B42D 25/41*** | (2014.01) |
| ***B42D 25/45*** | (2014.01) |

(52) U.S. Cl.

CPC ............. *B42D 25/346* (2014.10); *B41M 5/34* (2013.01); *B42D 25/373* (2014.10); *B42D 25/41* (2014.10); *B42D 25/45* (2014.10)

(58) Field of Classification Search

CPC ........... B41M 5/34; B41M 3/14; B42D 25/41; B42D 25/45; B42D 25/435; B42D 25/346; B42D 25/373

USPC ........ 283/62, 67, 70, 72, 74, 75, 87, 91, 94, 283/98, 114, 901

See application file for complete search history.

(56) References Cited

U.S. PATENT DOCUMENTS

| | | | | |
|---|---|---|---|---|
| 2005/0001419 | A1* | 1/2005 | Levy | B41M 5/24 281/2 |
| 2018/0050555 | A1* | 2/2018 | Berthe | B41M 3/14 |
| 2020/0215846 | A1* | 7/2020 | Ordung | B42D 25/346 |

FOREIGN PATENT DOCUMENTS

| | | | |
|---|---|---|---|
| EP | 3 828 000 | A1 | 6/2021 |
| FR | 2 972 553 | A1 | 9/2012 |
| FR | 3 055 112 | A1 | 2/2018 |
| JP | 2005-219296 | A | 8/2005 |
| WO | WO 2016/030315 | A1 | 3/2016 |
| WO | WO 2019/034398 | A1 | 2/2019 |

OTHER PUBLICATIONS

Preliminary Report on Patentability and Written Opinion issued May 2, 2023, in corresponding French Patent Application No. FR 2209844 (with English Translation), 16 pages.

Extended European Search report date Feb. 9, 2024, issued in counterpart EP Application No. 23186957. (3 pages).

* cited by examiner

*Primary Examiner* — Justin V Lewis

(74) *Attorney, Agent, or Firm* — Oblon, McClelland, Maier & Neustadt, L.L.P.

(57) ABSTRACT

A security document having a stack of layers including a matrix of coloured sub-pixels, an opaque layer with a white appearance above the matrix of coloured sub-pixels, the opaque layer with a white appearance having perforations facing sub-pixels of the matrix of coloured sub-pixels such that, when the device is observed from above, a coloured image appears.

14 Claims, 7 Drawing Sheets

[Fig. 1]
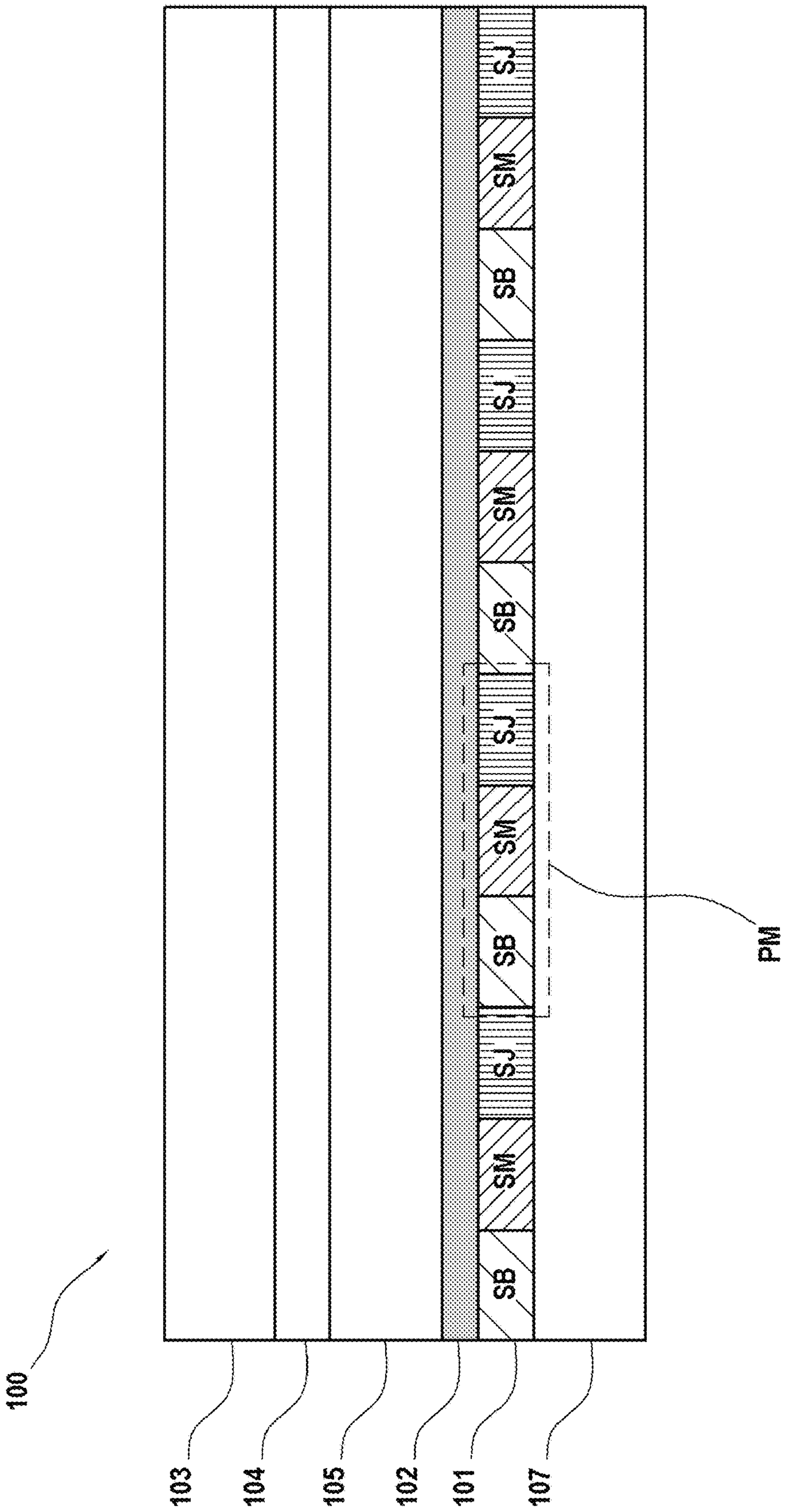

[Fig. 2]
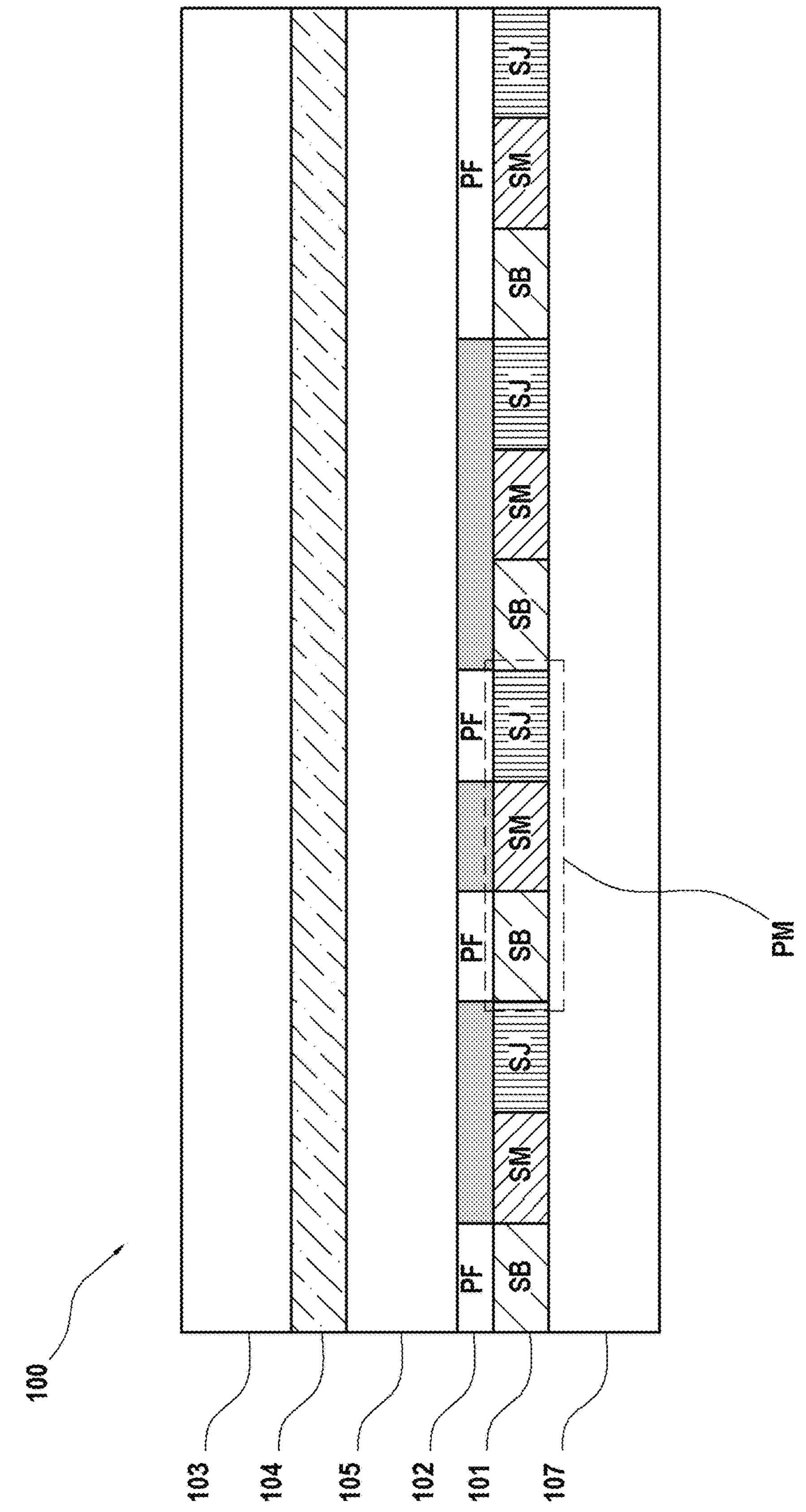

[Fig. 3]
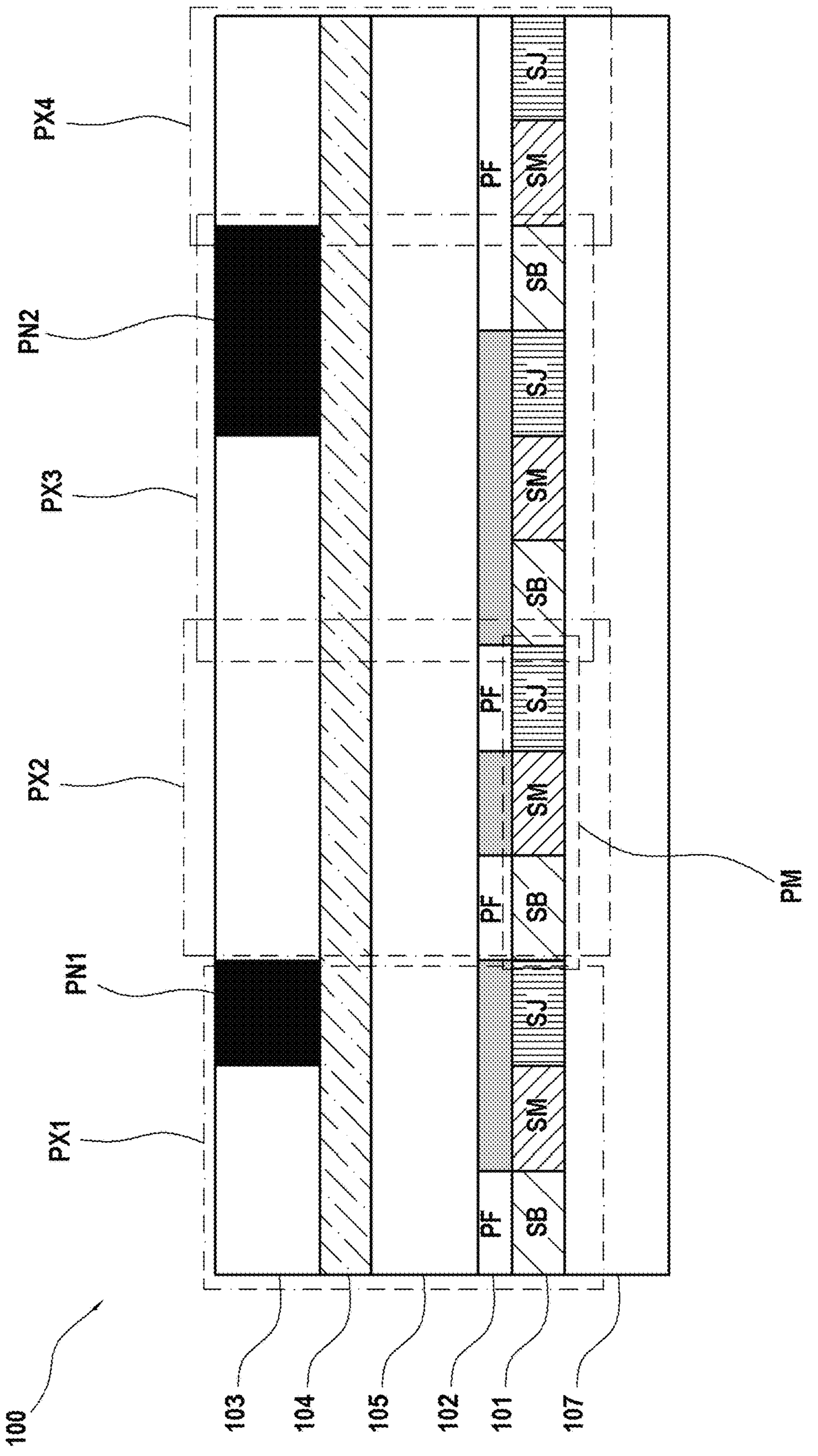

[Fig. 4]
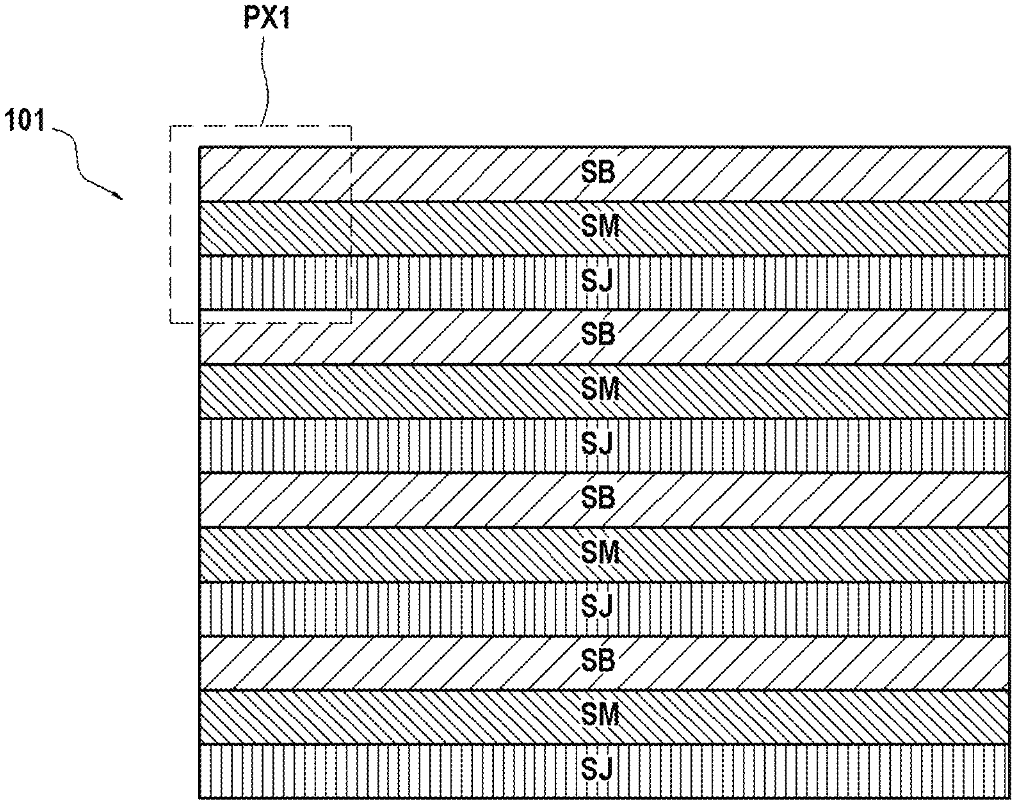
[Fig. 5]
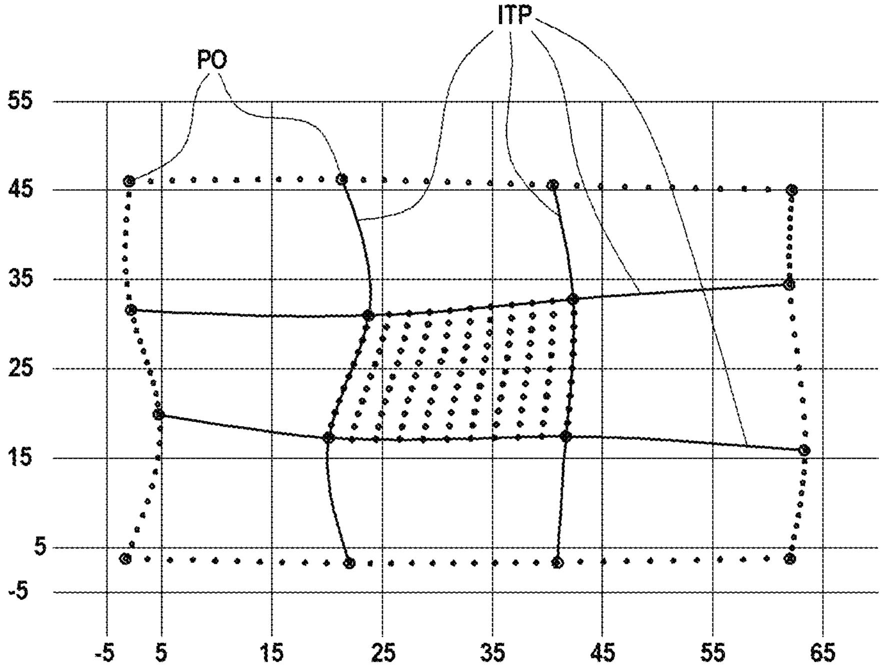

[Fig. 6]
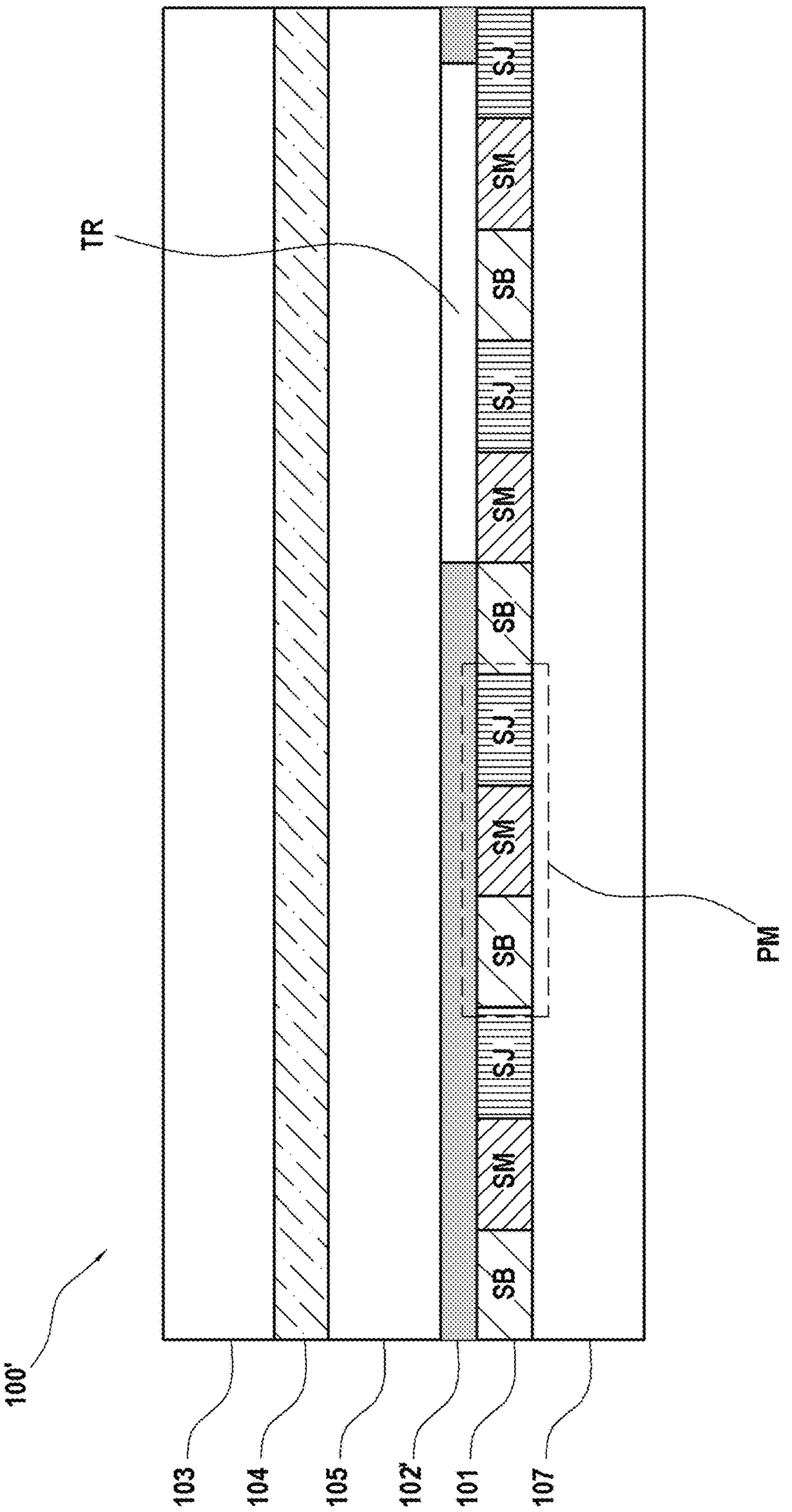

[Fig. 7]
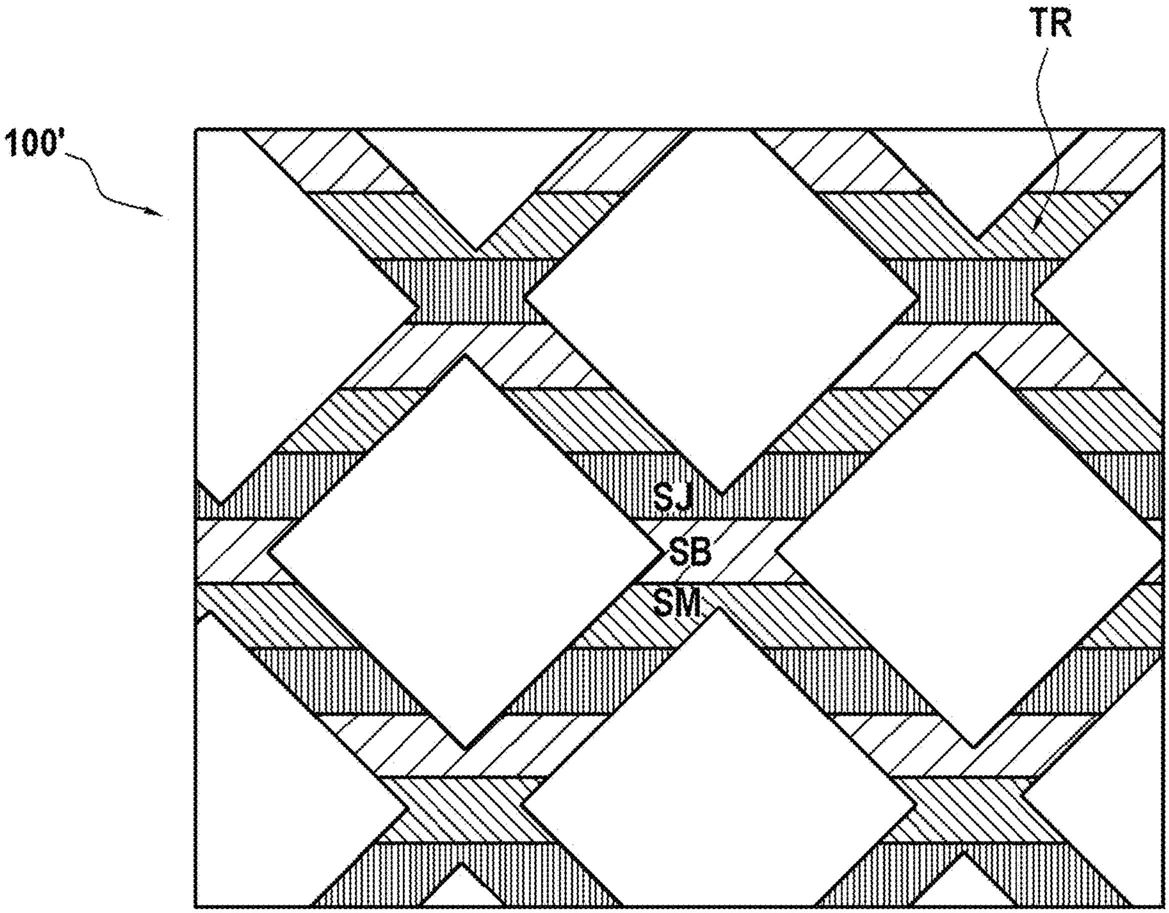

[Fig. 8]
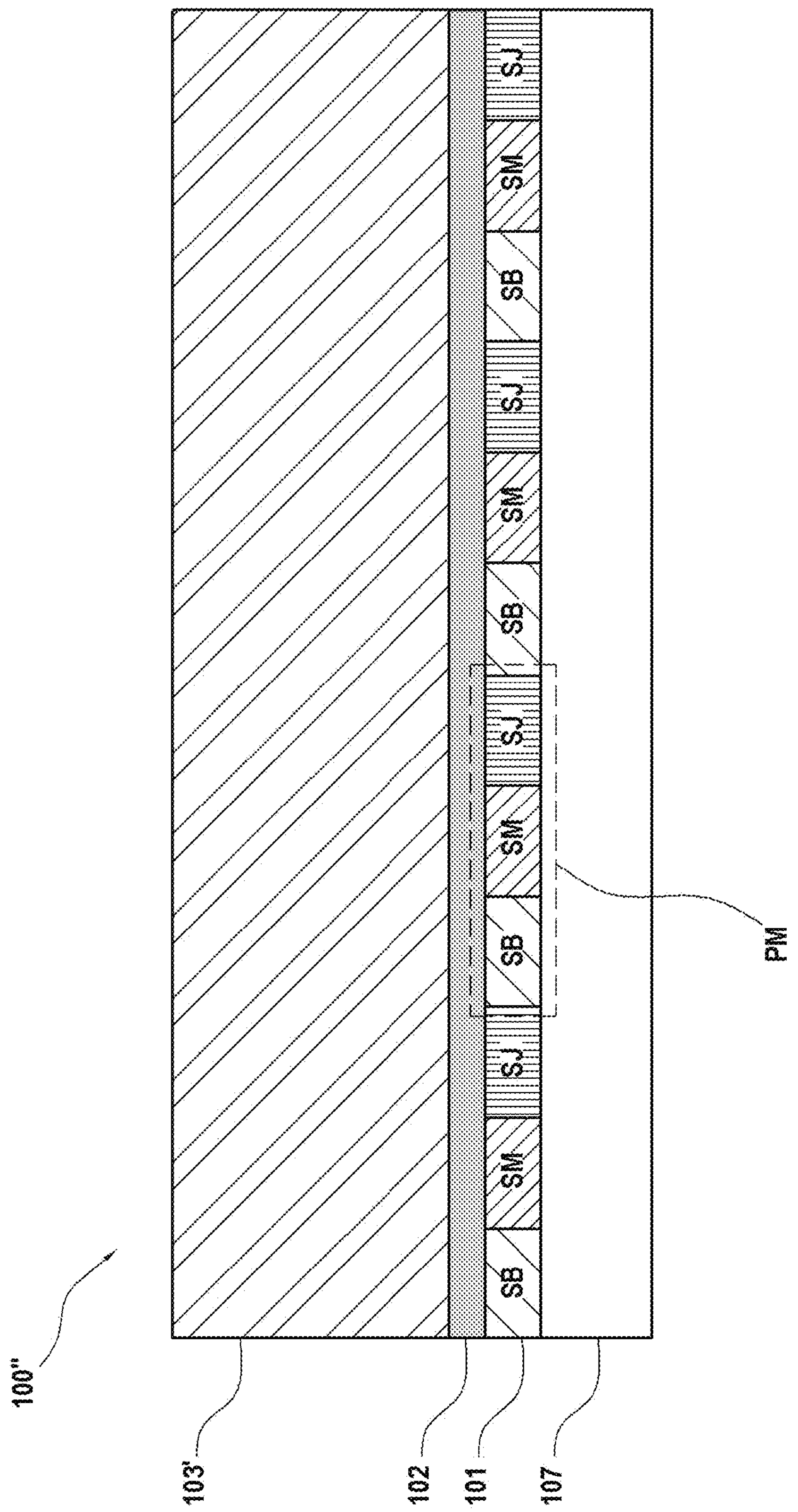

SECURITY DOCUMENT COMPRISING A PERFORATED OPAQUE LAYER WITH A WHITE APPEARANCE ABOVE A MATRIX OF COLOURED SUB-PIXELS

TECHNICAL FIELD

The invention relates to the field of security documents, and in particular to security documents on or inside which images are able to be observed. The invention is applicable, not exclusively, to physical identity documents, such as a passport, an identity card, a driving licence, a residence permit, etc.

PRIOR ART

The identity market nowadays requires physical identity documents (also called identification documents or security documents) to be increasingly secure. This market relates to highly diverse documents, such as identity cards, passports, access badges, driving licences, etc., which may take various formats (cards, booklets, etc.).

Security documents have to be able to be authenticated easily and quickly. They also have to be difficult to counterfeit (if possible forgery-proof), specifically in the light of the latest counterfeiting techniques.

Security documents generally contain coloured images, for example photographs of faces of a holder of the security document.

Coloured image formation techniques for secure identity documents use matrices of coloured sub-pixels (for example with red-green-blue sub-pixels or cyan-magenta-yellow sub-pixels) and techniques for blackening a layer that will mask portions of sub-pixels so as to obtain pixels of a desired colour.

For example, it is known to use laserable layers, described in prior art document FR 2 972 553, in which a laserable layer tops a matrix of coloured sub-pixels.

Laserable is understood to mean that the application of a laser beam to the layer (generally called laserization) generates visible greyscale levels through carbonization in this layer. By way of indication, a laserable layer may be a layer of transparent polycarbonate and may comprise additives sensitive to the passage of a laser beam since this beam carbonizes them. Such a laserable layer will be blackened or at least partially greyed over its entire thickness depending on the power of the laser since the additives sensitive to the passage of a laser beam are distributed uniformly throughout the thickness of the layer.

Colour image formation techniques that are used nowadays, such as those that use laserable layers, in particular in secure identity documents, do not always make it possible to obtain a satisfactory visual rendering quality. Problems occur in particular when the image formation techniques that are used are limited in terms of their ability to produce certain colours. In other words, the colour gamut (variety of colours able to be produced) in known colour image formation techniques is sometimes limited.

One solution to this problem has been described in document FR 3 079 052, which proposes to implement lenses facing coloured pixels so as to focus light on white sub-pixels and improve the colour gamut. This solution has the drawback of heating the documents, which may produce deformations. Furthermore, the magnification of the lenses is not satisfactory for having a sufficiently broad gamut.

There is a need for security documents with coloured images that have a less limited colour gamut.

SUMMARY OF THE INVENTION

To this end, the present invention proposes a security document comprising a stack of layers comprising a matrix of coloured sub-pixels, an opaque layer with a white appearance above the matrix of coloured sub-pixels, wherein the opaque layer with a white appearance comprises perforations facing (for example above) sub-pixels of the matrix of coloured sub-pixels such that, when the device is observed from above, a coloured image appears.

The invention thus proposes to use an opaque layer with a white appearance that is able to be perforated so as to reveal coloured sub-pixels that were masked by this opaque layer with a white appearance. It is thus possible to form pixels of the image with coloured sub-pixels and a white contribution via the white opaque layer, and also completely white pixels, thereby making it possible to have an expanded colour gamut, and in particular colours that are brighter.

The invention also makes it possible to do away with the use of lenses, the manufacture of which may heat the documents.

It should be noted that a person skilled in the art will know how to choose the opaque layer with a white appearance such that perforations are able to be formed therein. Furthermore, this layer is opaque, such that the matrix of coloured sub-pixels is not transparently visible to the eye of a user, unless using for example a lamp on the back of the document. Opaque is thus understood to mean a good level of opacity, for example a level that conceals the matrix of coloured sub-pixels, without using a lighting appliance underneath the device. “Opaque” may thus be defined as meaning that the opaque layer with a white appearance masks the matrix of coloured sub-pixels for a user observing it, without using a lighting appliance underneath the device (for example, lighting above the device is possible).

In the coloured image that appears, pixels are defined as regions comprising coloured sub-pixels that are visible through one or more perforations, possibly a portion of the opaque layer with a white appearance, or else only a portion of the opaque layer with a white appearance (which may correspond to a white sub-pixel). It is possible to divide the image into pixels all having the same dimensions. It will be understood that it is thus possible to obtain a coloured image with completely white or partially white pixels, or else with no portion of the opaque layer with a white appearance.

According to one particular embodiment, the document furthermore comprises a laserable layer arranged above the opaque layer with a white appearance and configured to be laserized by applying a laser beam at at least one laserization wavelength.

As explained above, a laserable layer is such that applying a laser beam to this layer generates greyscale levels that are visible through carbonization in this layer. By way of indication, a laserable layer may be a layer of transparent polycarbonate and may comprise additives sensitive to the passage of a laser beam since this beam carbonizes them. Such a laserable layer will be blackened or at least partially greyed over its entire thickness depending on the power of the laser since the additives sensitive to the passage of a laser beam are distributed uniformly throughout the thickness of the layer.

The use of the laserable layer will make it possible to expand the colour gamut towards dark colours, since completely black pixels may be obtained by laserization.

The laserable layer may be transparent, and the opaque layer with a white appearance is therefore more opaque than this layer.

According to one particular embodiment, the laserable layer comprises portions that are blackened by laserization.

For example, these blackened portions are above coloured sub-pixels so as to affect the hue that is perceived. Therefore, these blackened portions may be above portions of the opaque layer with a white appearance or above perforations in this layer. It will therefore be readily understood how the colour gamut is thus improved (a black channel is added).

The blackened portions improve the contrast of the coloured images that are obtained.

According to one particular embodiment, the document furthermore comprises a filter limiting the passage of at least the laserization wavelength, the filter being arranged between the laserable layer and the opaque layer with a white appearance, or the laserable layer is configured to form a filter limiting the passage of at least the laserization wavelength.

The use of a filter is well-suited to fragile opaque layers with a white appearance, for example thin metal oxide layers, which might be affected, for example perforated by the laser beam at the laserization wavelength.

The filter may either be a filtering layer assembled by lamination or, alternatively, be the laserable layer itself.

By way of indication, it is possible to use a laserable layer that filters ultraviolet radiation (UV) and that is sensitive to UV radiation for the laserization.

According to one particular embodiment, the opaque layer with a white appearance is chosen so as to be perforated by a laser beam with a perforation wavelength.

This particular embodiment makes it possible to easily customize the coloured image.

According to one particular embodiment, the perforation wavelength is different from the laserization wavelength.

For example, this makes it possible to perforate the opaque layer with a white appearance without the laserable layer being laserized.

It is possible to use a laser beam for the laserization with an energy greater than the laser beam used for the perforation.

For example, for a laserization wavelength within the UV range, it is possible to use a perforation wavelength in the infrared range (the filter being able to be configured to let this wavelength through).

According to one particular embodiment, a pixel of the coloured image comprises a coloured sub-pixel visible through a perforation and a portion with a white appearance of the opaque layer with a white appearance forming a white sub-pixel of the pixel.

According to one particular embodiment, the opaque layer with a white appearance comprises a metal oxide.

The invention also proposes a method for manufacturing a security document, comprising assembling a matrix of coloured sub-pixels with, above the matrix of coloured sub-pixels, an opaque layer with a white appearance, the method furthermore comprising forming perforations through the opaque layer with a white appearance and facing sub-pixels of the matrix of coloured sub-pixels such that, when the device is observed from above, a coloured image appears.

This method may be adapted to the manufacture of all of the embodiments of the security document as described above.

According to one particular mode of implementation, a laserable layer is furthermore assembled above the opaque layer with a white appearance and configured to be laserized by applying a laser beam at at least one laserization wavelength.

According to one particular mode of implementation, the laserable layer is laserized so as to obtain blackened portions.

According to one particular mode of implementation, a filter limiting the passage of at least the laserization wavelength is furthermore assembled between the laserable layer and the opaque layer with a white appearance.

This filter makes it possible not to damage the opaque layer with a white appearance, which may be very fragile since it is able to be perforated for example by applying a laser beam.

This filter may be a filter that filters at least the laserization wavelength but that lets other wavelengths through.

According to one particular mode of implementation, the opaque layer with a white appearance is perforated by a laser beam with a perforation wavelength so as to obtain the perforations.

According to one particular mode of implementation, the perforation wavelength is different from the laserization wavelength (the perforation wavelength is preferably not filtered by the filter).

This particular embodiment proposes to use two different laser wavelengths, this being advantageous since the energy needed for carbonization may be equal to several times that needed for perforation.

In fact, for a laser beam with a given wavelength used for carbonization and then stopped by the filter, it is no longer possible to transmit enough energy to perforate the opaque layer with a white appearance underneath the filter without further carbonizing the laserable layer. However, it is desirable to be able to make a colour sub-pixel visible underneath the opaque layer with a white appearance without carbonization in line with this sub-pixel. Therefore, using another wavelength that is not stopped by the filter or at the very least stopped to a lesser extent by the filter may perforate the opaque layer with a white appearance without contributing to carbonization. This makes it possible to independently generate colours and a black channel that provides contrast.

According to one particular mode of implementation, the method comprises a registration phase comprising observing the position of a group of coloured sub-pixels prior to the formation of the perforations that form the coloured image.

The registration phase is a phase during which the position of the coloured sub-pixels of the matrix of coloured sub-pixels is determined such that the formation of the perforations takes these positions into account.

Since the coloured sub-pixels are arranged in a matrix, they are aligned in two orthogonal directions. By way of indication, the matrix of coloured sub-pixels may comprise sub-pixels having a number N of colours (for example N=3), arranged in a pattern in which at least N sub-pixels all having different colours repeat in the two orthogonal directions so as to form the matrix of coloured sub-pixels.

The position of a sub-pixel of a given colour at a position makes it possible to deduce the position of the other sub-pixels during the registration.

The position of multiple coloured sub-pixels makes it possible to implement an interpolation between these coloured sub-pixels so as to deduce the position of the other sub-pixels more accurately during the registration. It is thus possible to take deformations of the matrix of coloured sub-pixels into account.

The registration step facilitates the subsequent implementation of the formation of the perforations in the opaque layer with a white appearance, since it makes it possible to ascertain the colour of the sub-pixels that will be exposed by the perforations.

According to one particular mode of implementation, the coloured sub-pixels of the group of coloured sub-pixels may be observed through one or more perforations in the opaque layer with a white appearance.

The perforations used in this step might not be the perforations that will be used so that the coloured image appears, but perforations formed before the ones that will be used so that the coloured image appears (even though they may be visible within the coloured image).

According to one particular mode of implementation, a set of trenches is formed in a grid-shaped pattern through the opaque layer with a white appearance.

For example, these trenches are produced through a demetallization method at the time when the opaque layer with a white appearance is deposited. As an alternative, the opaque layer with a white appearance may be deposited over the entire surface and the partial ablation may be carried out for example in a grid-shaped pattern before lamination of this layer in the document.

This set of trenches makes it possible to improve the adhesion of the opaque layer with a white appearance to the other layers of the security document.

According to one particular mode of implementation, the position of the group of coloured sub-pixels is observed through these trenches.

This mode of implementation is particularly advantageous since it uses the trenches that improve the adhesion of the opaque layer with a white appearance to the other layers of the security document to observe the sub-pixels and implement a registration.

It may be noted that the trenches may be produced during a step that is not that of forming the perforations; in particular, the trenches are produced here before the perforations.

BRIEF DESCRIPTION OF THE DRAWINGS

Other features and advantages of the present invention will become apparent from the description given below, with reference to the appended drawings, which illustrate exemplary embodiments thereof that are completely non-limiting in nature. In the figures:

FIG. 1 is a sectional view of a security document before perforation, according to one example, FIG. 2 is a sectional view of the document of FIG. 1 after perforation, FIG. 3 is a sectional view of the document of FIG. 2 after laserization, FIG. 4 is a plan view of the matrix of coloured sub-pixels, FIG. 5 is an illustration of interpolations determined during a registration, FIG. 6 is a sectional view of a document with trenches before perforation, FIG. 7 is a plan view of the document of FIG. 6, and FIG. 8 is a sectional view of a document with a filtering laserable layer.

DESCRIPTION OF EMBODIMENTS

A description will now be given of security documents comprising both matrices of coloured sub-pixels and opaque layers with a white appearance, with a colour gamut that is improved at least in terms of brightness.

The images formed by these sub-pixels are customizable images, which may be different for each document, and which may be specific to each document user.

The documents described here may be physical identity documents such as a passport, an identity card, a driving licence, a residence permit, etc. In fact, the documents described here may be associated with a user, and the coloured images that will be obtained may be images of the faces of the users.

FIG. 1 schematically shows a document 100 obtained by assembling various layers, which may have been implemented by way of lamination.

Very particularly, the document 100 comprises a matrix of coloured sub-pixels 101, for example a transparent or opaque layer on which there have been printed coloured elements that each form coloured sub-pixels. Here, the matrix of coloured sub-pixels comprises sub-pixels having three possible colours, cyan sub-pixels SB, magenta sub-pixels SM, and yellow sub-pixels SJ. The three colours of the colour model well known to a person skilled in the art by the acronym CMY ("cyan magenta yellow") are found here. The invention is not limited to this colour model and may also use a model such as the RGB ("red green blue") model. Of course, it is possible to use other colour triplets different from CMY and RGB.

The sub-pixels are arranged in a matrix, which will be described in more detail with reference to FIG. 4. It may nevertheless be noted that a pattern PM of three sub-pixels SB, SM and SJ is repeated multiple times in the section visible in FIG. 1.

An opaque layer with a white appearance 102, for example a thin metal oxide layer, has been assembled above the matrix of coloured sub-pixels. This layer may be chosen such that perforations are able to be formed easily in this layer, for example by applying a laser beam with a given wavelength, called perforation wavelength.

A laserable layer 103 has been arranged above the opaque layer with a white appearance 102. This laserable layer is an initially transparent layer that contains particles that are able to be carbonized by applying a laser beam, and very particularly a laser beam at a given wavelength, called laserization wavelength. The application of the laser beam will create greyscale portions or even black portions in the laserable layer. By way of indication, the laserable layer comprises polycarbonate and the particles that react to the laser beams.

In order not to damage the opaque layer with a white appearance 102 during the laserization of the document 100, a filter 104 is arranged between the laserable layer 103 and the opaque layer with a white appearance 102. This filter is configured to limit the passage of a laser beam at the laserization wavelength, such that this wavelength does not reach the opaque layer with a white appearance. By contrast, preferably, this filter lets through the abovementioned perforation wavelength, which differs from the laserization wavelength.

For example, the filter may comprise a polymer layer (possibly of the same type of polymer as other layers of the document), but one that is charged with a substance that absorbs a given spectrum comprising the laserization wavelength. The transmittance of the filter is therefore low over the laserization wavelength and greater over other wavelengths (in particular the perforation wavelength).

It may be noted that the substance that is used may be different depending on whether it is desired to stop/filter infrared or ultraviolet radiation. It is also possible to use a laserable polycarbonate layer that also filters UV and that is laserized by UV radiation.

For example, and as will be described with reference to FIG. 8, it is possible to use a polycarbonate layer that carbonizes on its surface with a laser having UV radiation, and to implement the perforation of the opaque layer with a white appearance with low-power infrared radiation (such that it does not carbonize the laserable layer).

Optionally, a transparent intermediate layer 105, for example made of polycarbonate, is arranged between the opaque layer with a white appearance 102 and the filter 104.

Therefore, optionally, a protective layer 107, which may be opaque or transparent, for example made of polycarbonate, has been arranged underneath the matrix of coloured sub-pixels 101.

FIG. 2 shows the document 100 after a step of forming perforations PF in the opaque layer with a white appearance has been implemented. This step may comprise applying a laser beam at the perforation wavelength.

At this stage, it should be noted that each pattern of coloured sub-pixels PM is associated with various perforations. From left to right in the figure:

- the first pattern is associated with a single perforation above its cyan sub-pixel; when it is observed from above the document, it will have a very bright cyan appearance (it is associated with two portions with a white appearance);
- the second pattern is associated with two perforations above its cyan sub-pixel and above its yellow sub-pixel; it will have a fairly bright green appearance (it is associated with one portion with a white appearance);
- the third pattern does not have any perforation; it will appear white when observed from above; and
- the fourth pattern comprises perforations above all of its sub-pixels; it will have a grey appearance due to the combination of the three cyan, yellow and magenta components.

A coloured image appears facing the document 100, with colours that are brighter than in the techniques according to the prior art. It may be noted that the combination of the patterns and perforations forms image pixels but, as will be described below, those obtained after the optional laserization step are called pixels.

FIG. 3 shows the document 100 after a laserization step has been implemented. In this step, a laser beam has been applied to the top of the document 100 so as to form blackened (or at least greyed) portions in the thickness of the laserable layer 103.

More specifically, a blackened portion PN1 has been formed above the yellow sub-pixel of the sub-pixel pattern furthest to the left in the figure, and a blackened portion PN2 has been formed above the magenta and yellow sub-pixels of the third sub-pixel pattern from the left in the figure. This thus gives a coloured image when observing the document 100 from above, comprising (considering the pixels from left to right in the figure):

- a pixel PX1 with a cyan appearance, not as bright as the one obtained in FIG. 2 at the same location;
- a pixel PX2 with a green appearance, identical to the one of FIG. 2 at the same location;
- a pixel PX3 with a grey appearance, which results from the presence of the blackened portion PN2 over two thirds of the surface area of the pixel PX3; and
- a pixel PX4 with a grey appearance, identical to the one of FIG. 2 at the same location.

It will be understood that the combination of the perforated opaque layer with a white appearance 102 with the laserized layer 103 makes it possible to obtain a very broad colour gamut, in particular for the brightest colours.

FIG. 4 shows a plan view of the matrix of coloured sub-pixels 101. By way of indication, the surface area occupied by the pixel PX1 described with reference to FIG. 3 is represented by a dashed rectangle.

Here, coloured rows are aligned in groups of three colours, that is to say three rows.

It may be noted that, in solutions according to the prior art, a fourth white row may be added to obtain brighter colours. That being the case, the addition of this fourth row will increase the size of the pixels and reduce the resolution of the images, while at the same time being less satisfactory in terms of colour gamut, since the maximum possible saturation of the colours will be lower. Indeed, when only 3 colours are present without white, each one of them covers ⅓ of the surface area, while if the white rows are present, each colour covers only ¼ of the surface area, leading to lower saturation.

Other arrangements are possible, and in particular with other colours and other matrix formats.

FIG. 5 shows the result of a registration phase.

This registration phase is implemented prior to the formation of the perforations and aims to ascertain the position of the coloured sub-pixels of the matrix of coloured sub-pixels, in particular in the event of deformations of this matrix within a document.

The registration may be implemented automatically, for example by way of a computer system equipped with a camera for observing documents.

In this phase, it is possible to observe the position of a group of coloured sub-pixels denoted PO in FIG. 5. For example, these sub-pixels may be observed through initial perforations used only for the registration. Alternatively, it is possible to observe the coloured sub-pixels transparently through the document, for example using a powerful lighting device underneath the document.

Given the observed position of the coloured sub-pixels PO (which have expected colours at expected locations), it is possible to deduce for example regression polynomial equations that pass through these points and obtain a transformation to be applied to the matrix to estimate the position of each coloured sub-pixel. In fact, this transformation deforms an initially orthonormal grid pattern.

This step is advantageous for sub-pixels having dimensions of the order of 60 to 70 micrometres, to ensure that a laser beam is applied above the correct sub-pixels to make a coloured image with the correct hues appear on each document.

FIG. 6 shows a document 100' according to one variant in which a trench TR has been formed in an opaque layer with a white appearance 102'. Elements bearing the same references in this figure and in FIGS. 1 to 5 are identical.

This trench TR makes it possible to improve adhesion between the opaque layer with a white appearance 102', which may comprise a metal oxide, and the other layers of the document, which are for example made of polymer.

Furthermore, it is possible to observe coloured sub-pixels through this trench that is formed before the perforations. This makes it possible to implement the registration, the pixels of the pixel group being visible through the trench (or the trenches if there are several of them, as in FIG. 7).

One advantageous arrangement for trenches TR is shown in FIG. 7, in which it is seen, from above, that a grid pattern is formed by the trenches TR.

FIG. 8 shows a document 100" according to another variant. Elements bearing the same references in this figure and in FIGS. 1 to 5 are identical. Here, the laserable layer 103' reacts, for the laserization, to radiation with a laserization wavelength in the ultraviolet (UV) range. This layer is furthermore configured to act as a filter for the UV (the carbonization may take place on the upper surface in the figure). Therefore, the UV radiation does not affect the opaque layer with a white appearance 102 and does not damage it during the laserization.

The opaque layer with a white appearance may nevertheless be perforated with a laser beam with a wavelength in the infrared range, for example one with low intensity. The laserable layer 103' may be configured to let this infrared laser beam through.

This embodiment is advantageous in that it requires fewer layers to form a document.

It may be noted that the perforations described here may have dimensions of the order of those of a sub-pixel or even dimensions smaller than those of a sub-pixel. The blackened portions may also have dimensions of the order of those of a sub-pixel or even dimensions smaller than those of a sub-pixel. It will be understood that this makes it possible to have fine adjustment of the colours of each pixel.

A person skilled in the art will understand that the embodiments and variants described above are merely non-limiting exemplary implementations of the invention. In particular, a person skilled in the art will be able to envisage any adaptation or combination of the embodiments and variants described above, in order to meet a particular need according to the claims presented below.

The invention claimed is:

1. A security document comprising:
- a stack of layers having a matrix of coloured sub-pixels;
- an opaque layer with a white appearance above the matrix of coloured sub-pixels; and
- a laserable layer arranged above the opaque layer with a white appearance and configured to be laserized by applying a laser beam at at least one laserization wavelength,
- wherein the opaque layer with a white appearance includes perforations facing sub-pixels of the matrix of coloured sub-pixels such that, when the security document is observed from above, a coloured image appears,
- wherein the perforations pass through the opaque layer, and
- wherein the laserable layer comprises portions that are blackened by laserization.

2. The security document according to claim 1, further comprising a filter limiting passage of at least the laserization wavelength, the filter being arranged between the laserable layer and the opaque layer with a white appearance, or
- wherein the laserable layer is configured to form the filter limiting the passage of at least the laserization wavelength.

3. The security document according to claim 1, wherein the opaque layer with a white appearance is chosen to be perforated by a laser beam with a perforation wavelength.

4. The security document according to claim 1, wherein a perforation wavelength is different from the laserization wavelength.

5. The security document according to claim 1, wherein a pixel of the coloured image includes a coloured sub-pixel visible through a perforation and a portion with a white appearance of the opaque layer with a white appearance forming a white sub-pixel of the pixel.

6. A method for manufacturing a security document, comprising:
- assembling a matrix of coloured sub-pixels with, above the matrix of coloured sub-pixels, an opaque layer with a white appearance; and
- forming perforations through the opaque layer with a white appearance and facing sub-pixels of the matrix of coloured sub-pixels such that, when the security document is observed from above, a coloured image appears,
- wherein the perforations pass through the opaque layer and the opaque layer includes a metal oxide,
- wherein a laserable layer is furthermore assembled above the opaque layer with a white appearance and configured to be laserized by applying a laser beam at at least one laserization wavelength, and
- wherein the laserable layer is laserized to obtain blackened portions.

7. The method according to claim 6, wherein a filter limiting passage of at least the laserization wavelength is furthermore assembled between the laserable layer and the opaque layer with a white appearance, or
- wherein the laserable layer is configured to form the filter limiting the passage of at least the laserization wavelength.

8. The method according to claim 6, wherein the opaque layer with a white appearance is perforated by a laser beam with a perforation wavelength to obtain the perforations.

9. The method according to claim 6, wherein a perforation wavelength is different from the laserization wavelength.

10. The method according to claim 6, further comprising, in a registration phase, observing a position of a group of coloured sub-pixels prior to formation of the perforations that form the coloured image.

11. The method according to claim 10, wherein the coloured sub-pixels of the group of coloured sub-pixels are observable through one or more perforations in the opaque layer with a white appearance.

12. The method according to claim 6, wherein a set of trenches is formed in a grid-shaped pattern through the opaque layer with a white appearance.

13. The method according to claim 10, wherein the position of the group of coloured sub-pixels is observed through trenches.

14. A security document comprising:
- a stack of layers having a matrix of coloured sub-pixels; and
- an opaque layer with a white appearance above the matrix of coloured sub-pixels,
- wherein the opaque layer with a white appearance includes a trench and perforations facing sub-pixels of the matrix of coloured sub-pixels such that, when the security document is observed from above, a coloured image appears,
- wherein the perforations pass through the opaque layer and the opaque layer includes a metal oxide, and
- wherein the trench is independent from the perforations.

* * * * *